United States Patent
Jin et al.

(10) Patent No.: US 12,294,515 B2
(45) Date of Patent: May 6, 2025

(54) QUALITY SENSING NETWORK MANAGEMENT

(71) Applicant: Hewlett Packard Enterprise Development LP, Spring, TX (US)

(72) Inventors: Jiabao Jin, Beijing (CN); Yi Hou, Beijing (CN); Chunfeng Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 103 days.

(21) Appl. No.: 18/120,851

(22) Filed: Mar. 13, 2023

(65) Prior Publication Data
US 2024/0314064 A1    Sep. 19, 2024

(51) Int. Cl.
H04L 47/24 (2022.01)
H04L 41/5025 (2022.01)
(Continued)

(52) U.S. Cl.
CPC ........ H04L 45/302 (2013.01); H04L 41/5025 (2013.01); H04L 47/24 (2013.01); H04L 65/80 (2013.01)

(58) Field of Classification Search
CPC ... H04L 45/302; H04L 41/5025; H04L 47/24; H04L 65/80
See application file for complete search history.

(56) References Cited

U.S. PATENT DOCUMENTS 7,283,561 B1 * 10/2007 Picher-Dempsey .... H04L 63/02
709/224
7,729,268 B2 * 6/2010 Matta ...................... H04L 43/55
370/252

(Continued)

FOREIGN PATENT DOCUMENTS

CN     109831386 A  *  5/2019
WO  WO-02101570 A1  * 12/2002  ............. H04L 29/06
WO  WO-2005022824 A1 * 3/2005  ............. H04L 45/02

OTHER PUBLICATIONS

Dobrijevic et al., "Ant Colony Optimization for QoE-centric Flow Routing In Software-defined Networks", IEEE, XploreIEEE Conferences, Nov. 2015, 11th International Conference on Network and Service Management (CNSM) (2015, pp. 274-278) (Year: 2015).*
Barakabitze et al., QoEMultiSDN: Management of Multimedia Services using MPTCP/SR in Softwarized and Virtualized Networks, IEEE Xplore, Nov. 2020. (Year: 2020).*

(Continued)

Primary Examiner — Oanh Duong
(74) Attorney, Agent, or Firm — Yao Legal Services, Inc.

(57) ABSTRACT

One aspect provides a system and method for selecting a path for a data flow in a network. During operation, a first node receiving the data flow can determine flow information that specifies a destination node. The system estimates a Quality of Experience (QoE) value of each node based on the flow information and current operating status of each node. A management service generates a QoE topology of the network based on connectivity among the nodes and the QoE value associated with each node; determines a plurality of potential paths between the first node and the destination node, with each potential path comprising a plurality of intermediate nodes; and selects a path that provides best QoE performance based on the QoE topology. Selecting the path comprises computing a cumulative QoE value of each potential path based on QoE values of the intermediate nodes included in the potential path.

20 Claims, 6 Drawing Sheets

(51) Int. Cl.
    *H04L 45/302*     (2022.01)
    *H04L 65/80*     (2022.01)

(56) References Cited

U.S. PATENT DOCUMENTS

| | | | | |
|---|---|---|---|---|
| 7,818,450 | B2* | 10/2010 | Chen | H04L 45/02 370/395.21 |
| 8,619,756 | B2* | 12/2013 | Das | H04L 45/302 370/351 |
| 11,876,705 | B2* | 1/2024 | Baniamerian | H04L 45/125 |
| 2008/0130627 | A1* | 6/2008 | Chen | H04L 45/3065 370/351 |
| 2015/0163714 | A1* | 6/2015 | Aghvami | H04W 36/322 370/230 |
| 2019/0222522 | A1* | 7/2019 | Shih | H04L 47/6255 |
| 2021/0029043 | A1* | 1/2021 | Dhanabalan | H04L 41/0894 |
| 2021/0092062 | A1* | 3/2021 | Dhanabalan | H04L 47/2425 |
| 2022/0191143 | A1* | 6/2022 | Vasseur | H04L 47/25 |
| 2023/0198895 | A1* | 6/2023 | Baniamerian | H04L 45/38 370/238 |
| 2024/0236860 | A1* | 7/2024 | Nguyen | H04W 52/0229 |

OTHER PUBLICATIONS

Barakovic et al., "Survey and Challenges of QoE Management Issues in Wireless Networks," Journal of Computer Networks and Communications, 2013, pp. 1-28.

Hoßfeld et al, "Challenges of QoE management for cloud applications," 2012, IEEE Communications Magazine, vol. 50, No. 4, pp. 28-36.

Huysegems et al., "Session reconstruction for HTTP adaptive streaming: laying the foundation for network-based QoE monitoring," 2012, Proceedings of the 2012 IEEE 20th International Workshop on Quality of Service, pp. 1-9.

Petrangeli et al., "Network-based dynamic prioritization of HTTP adaptive streams to avoid video freezes," 2015, 2015 IFIP/IEEE International Symposium on Integrated Network Management (IM), pp. 1242-1248.

Seufert et al., "A Survey on Quality of Experience of HTTP Adaptive Streaming," 2015, IEEE Communications Surveys and Tutorials, vol. 17, No. 1, pp. 469-492.

Wikipedia, "Quality of experience," available online at <https://en.wikipedia.org/w/index.php?title=Quality_of_experience&oldid=1136199771>. Jan. 29, 2023, 7 pages.

* cited by examiner

QUALITY SENSING NETWORK MANAGEMENT

BACKGROUND

Field

This disclosure is generally related to improving the performance of a network. More specifically, this disclosure is related to flow control based on the Quality of experience (QoE) values of nodes in the network.

BRIEF DESCRIPTION OF THE FIGURES

In the figures, like reference numerals refer to the same figure elements.

DETAILED DESCRIPTION

Quality of Experience (QoE) refers to the overall satisfaction and perception of a user regarding the delivery and consumption of digital content and services. It encompasses a wide range of factors, including the speed, reliability, and perceived value of the service, as well as the user's emotional and psychological response to the experience. The concept of QoE is becoming increasingly important as the demand for high-quality digital content and services continues to grow, and QoE has been seen as a critical metric for measuring the success of these offerings.

QoE metrics have been traditionally measured at client devices that directly interface with the users, without taking into consideration the performance of intermediate network nodes on the data path, such as switches, routers, access points (APs), intermediate Internet of Things (IoT) devices, etc. However, the performance of the intermediate network nodes can also affect the user experience. For example, a congested switch on the path of a data flow may cause undesired delay, thus negatively affecting the user experience.

To improve the overall network performance with respect to the QoE, a solution described herein extends the concept of the QoE from the client devices to intermediate network nodes, such that each node in the network can be associated with a QoE value based on how the node affects the QoE of services. The QoE values of the network nodes can be dynamic and application specific. According to some aspects of the instant application, the network-management service can perform intelligent flow control based on the QoE values of the nodes in the network.

Figure 1:
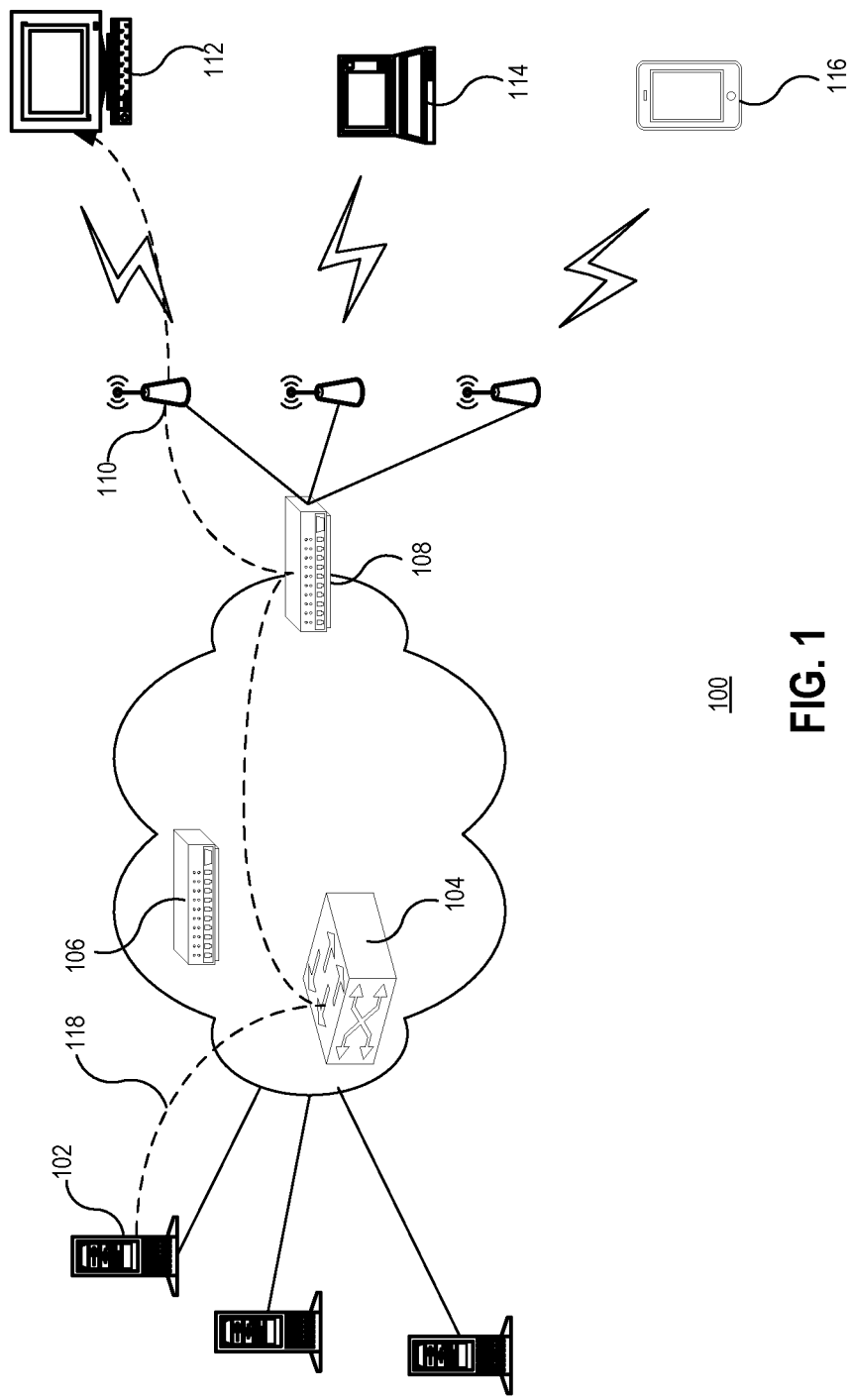
FIG. 1 illustrates an exemplary network implementing the Quality of Experience (QoE)-based path selection, according to one aspect of the instant application.

FIG. 1 illustrates an exemplary network implementing the Quality of Experience (QoE)-based path selection, according to one aspect of the instant application. In FIG. 1, a network 100 can include a number of application servers (e.g., a server 102), a number of network routers (e.g., router 104) and switches (e.g., switch 106), an access switch 108, a number of access points (APs) (e.g., AP 110), and a number of client devices (e.g., client devices 112, 114, and 116).

The application servers can provide various services (e.g., streaming services, gaming services, video-conference services, etc.) to users of the client devices (e.g., smart TVs, laptop computers, etc.) via the routers, switches, and APs in the network. As an example, FIG. 1 also shows an end-to-end data path 118 for an application, starting from the origin of the application data (e.g., application server 102) to the end device that receives the data (e.g., client device 112). In this example, the application can be a video-streaming application, and client device 112 can be a smart TV.

For users of the video-streaming application, the QoE of the application can be measured at client device 112, and many factors may affect the QoE, including the video startup time, rebuffering ratio, bit rate, resolution, jitter, latency, etc. These factors may depend on the operating status of the intermediate nodes (e.g., router 104, access switch 108, AP 110, etc.) on end-to-end path 118. According to some aspects of the instant application, to improve the QoE of the video-streaming application, the system may perform QoE-based flow control when selecting path 118 for delivering the streaming service to the user of client device 112. More specifically, the operating status of each intermediate node can be evaluated in terms of the QoE (i.e., based on how the node affects the QoE of the application), and nodes that may negatively affect the QoE may not be included in end-to-end path 118. In one example, among all possible paths between application server 102 and client device 112, end-to-end path 118 can be the path that provides the optimum QoE performance for the application.

According to some aspects, the impact of each intermediate node on the overall QoE of the application can be quantified. More specifically, each node in the network can be assigned a dynamic QoE value indicating the level of impact of the node on the QoE based on the current operating status of the node. Various aspects of the node's operating status may affect the application's QoE, including but not limited to: memory usage, central processing unit (CPU) utilization rate, node temperature, available buffer space on the data path, etc.

The QoE values can be binary. In some examples, when the performance of the node approaches its limit (which may negatively affect the QoE), the QoE value of the node can be set as "1." For example, if the current memory usage or CPU utilization rate of a node is equal to or greater than a predetermined threshold (e.g., 80%), the QoE value of the node can be set as "1." On the other hand, if the current memory usage or CPU utilization rate of the node is less than the predetermined threshold, the QoE value of the node can be set as "0." Alternatively, the QoE values can be multi-level (e.g., ranging from 0 to 5). A maximum QoE value may indicate that the node's negative impact on the QoE is maximum. For example, a memory usage or CPU utilization rate exceeding 90% can correspond to a QoE value of "5;" a memory usage or CPU utilization rate between 80% and 90% can correspond to a QoE value of "4,"; and so on.

In the above example, the QoE values are determined based on the memory usage or CPU utilization rate. Other factors can also affect the QoE value. In one example, the system can monitor the operating status of the node in various aspects (e.g., memory usage, CPU utilization rate, temperature, available buffer space, etc.), and if the node reaches the predetermined threshold in any aspect, the QoE value can be set as "1." In another example, the various factors can be combined according to a predetermined formula. For example, a QoE vector can be computed based on the various QoE-determination factors, with each component corresponding to a factor. The QoE vector can be expressed as [Q1, Q2, Q3, Q4], where the four components of the QoE vector correspond to a QoE value determined, respectively, based on memory usage, CPU utilization rate, temperature, and available buffer space. A QoE vector [0, 0, 0, 1] may indicate that the current memory usage, CPU utilization rate, and temperature of the node are all below their corresponding threshold and would not negatively affect the QoE of a data flow, but the current buffer space for that data flow is below a predetermined threshold and may negatively affect the QoE. Depending on the implementation, the final QoE value of the node can be computed based on the QoE vector in various ways. In one example, the final QoE value can be a simple summation of the vector components, i.e., Q=Q1+Q2+Q3+Q4. In another example, the final QoE value can be a weighted summation of the vector components, where each QoE component is assigned a weight factor.

In addition to associating the QoE value of a node with the node's current operating status, other types of metrics can also be used to define the QoE values. According to some aspects, a function between the Quality of Service (QOS) and the QoE can be determined, and the QoE value of a node can be derived based on the QoS parameters (e.g., delay, jitter, packet loss, throughput, etc.) measured at the node. Note that the QoS parameters can be obtained by entities monitoring the network performance (e.g., a network analyzer). Certain QoS parameters may also be extracted from packets passing through the node.

Machine-learning techniques can also be used to determine the QoE value of a node. For example, a machine-learning model (e.g., a neural network) can be trained to learn the correlation between the operating status of the nodes on the path of a flow and the QoE measured at the client device. The trained model can then be used to determine the QoE value of each node based on the monitored operating status of the node. The scope of this disclosure is not limited by the criteria and mechanisms used to determine the QoE values of the nodes.

Because the user's experience may be different for different applications, a node's impact on the QoE of different applications may not be the same. Accordingly, for a network node (e.g., a router, switch, or AP), its QoE value may not be the same for different applications. For example, the QoE value of a node for the video-conference application may not be the same as the node's QoE value for a gaming application. In addition, certain node performance factors (e.g., available buffer space) may be different for different applications or flows. According to some aspects, a QoE value should be computed for each flow or each type of flow. In other words, the QoE value of each node can be flow-specific or flow-type-specific. Note that the application or the type of application associated with each flow can be derived from the flow information (e.g., the source and destination addresses of the flow).

In addition to being flow-specific, a QoE value can also be time-varying. Monitoring the operating status of each node in real-time allows the system to determine the instant QoE values of each node. It may also be advantageous to be able to predict the future QoE values of the nodes in a network in order to perform QoE-based flow control. In other words, it may be desirable for the network management system to preemptively determine a flow-control strategy based on future QoE values of nodes in a network. Various mechanisms can be used to predict the QoE values of a node. The number and types of flows arriving at a node can change the operating status of the node because each incoming flow may require a certain amount of processing power, memory, and buffer space. Therefore, by predicting future flows to arrive at a node, the system can predict the QoE values for the node associated with those flows. According to some aspects, the system may predict the QoE values based on the most recently arrived flows. It is assumed that once a flow arrives at a node, the likelihood of packets belonging to the same flow or a flow of a similar type arriving at the node can be high. Accordingly, the system can predict the QoE value for a particular flow or a particular type of flow in the near future (e.g., in the next few minutes) based on information associated with the current flows. At the same time, the system can validate its prediction by computing, in real-time, the actual QoE value. In one example, the system may predict the QoE value at the next time step based on the QoE value of the current time step and continuously update the QoE value by performing the QoE computation at each time step.

According to some aspects, a flow-sampling approach can also be used to predict the QoE values. More specifically, the system can apply a clustering-analysis technique to cluster the various flows into a number of clusters (e.g., a Voice over Internet Protocol (VOIP) cluster, a video cluster, a gaming cluster, a text/graphic cluster, an encryption cluster, etc.). Because applications in each cluster can provide similar services to users, the QoE of the flows in the same cluster can be similar. The system can determine, for each cluster, a QoE value based on the node's operating status. Hence, during runtime, the system can classify each incoming flow and then determine the QoE value based on the cluster to which the flow belongs.

Because date and time can have a strong impact on network traffic and user experience, the system can also predict QoE values based on the time of the day and the day of the week. For example, video applications often have worse QoE at night than during the day because most users are streaming videos at night. Accordingly, the system may apply a machine-learning technique to learn a mapping relationship between the QoE value and time. The system can later use the learned mapping relationship to predict the QoE value at a future time instant. For example, by computing the QoE values at different time instants for N consecutive days, the system may be able to predict the QoE value at a particular time instant on day N+1.

According to an alternative aspect, the system can also use a machine-learning technique (e.g., training a deep-learning neural network) to directly learn the relationship between the flow information and the QoE value. The trained neural network can be used to predict the QoE value of a node for a particular flow based on the flow information.

To perform the QoE-based flow control, according to some aspects, a standalone network-management server or a cloud-based network-management platform can provide a management service and maintain a management database. The corresponding client service can be executed on each network node (i.e., switches, routers, APs, controllers, etc.). The client service can perform a number of QoE-related functions, including monitoring the flow information for each flow arriving at the node, monitoring the operating status (e.g., memory usage, CPU utilization rate/temperature, available buffer space, etc.) of the node, determining the QoE value for a flow arriving at the node based on the flow information and the node's operating status, and reporting the QoE value to the management service. The management service can store the QoE values in the management database and perform QoE-based flow control.

Note that, depending on the mechanisms used to compute the QoE values, the QoE computation may require different amounts of computing resources. For example, the computing resources needed for computing the QoE values based on a simple mapping relationship between the operating status of the node and the QoE values can be much less than the machine-learning-based approach for predicting the QoE values. To reduce the computing burden at the network nodes (i.e., switches, routers, APs, controllers, etc.), according to alternative aspects, the computation of the QoE values can be performed by the management service residing on the remote server or in the cloud. Each node in the network can periodically report its operating status and flow information associated with the flows arriving at the node to the management service, and the management service can compute the QoE values for the node based on the received information. Performing the QoE computation more frequently can increase the accuracy of the determined QoE values but will require more bandwidths and computing resources. According to one aspect, the time interval for each node to report its operating status and flow information to the management service can be between 30 seconds and five minutes. The management service can update the QoE values for each node based on such information received from the corresponding node.

Figure 2A:
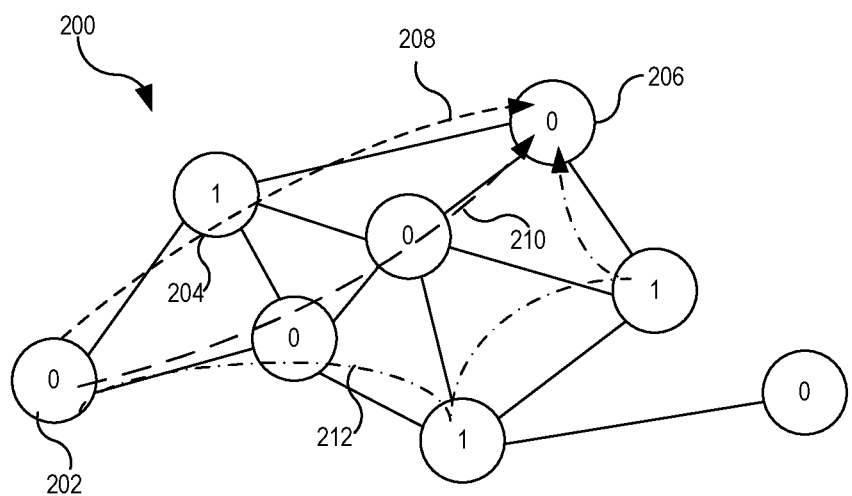
FIG. 2A illustrates an example of the Quality of Experience (QoE) topology of a network, according to one aspect of the instant application.

According to some aspects, the management service can generate a QoE topology of a network based on the connectivity among the nodes and the QoE value of each node in the network. To do so, the management service can first generate a network topology based on the connectivity information associated with the nodes. The management service can then assign a QoE value to each node in the network topology based on the result of the aforementioned QoE computation process. FIG. 2A illustrates an example of the Quality of Experience (QoE) topology of a network, according to one aspect. In FIG. 2A, a QoE topology 200 can include a number of interconnected nodes (e.g., nodes 202, 204, and 206), each node representing a networking device, such as a server, router, switch, AP, controller, terminal device, etc. In this example, each node is assigned a binary QoE value. For example, node 202 is assigned a QoE value of "0," node 204 is assigned a QoE value of "1," and node 206 is assigned a QoE value of "0." As discussed previously, the QoE value assigned to each node indicates whether the node negatively affects the user experience for a particular application or a particular type of application. More specifically, a "0" means that the node has no effect or a positive effect on the user experience, whereas a "1" means that the node has a negative effect on the user experience.

Once the QoE topology is generated, the management service can perform flow control based on the QoE topology. According to some aspects, the management service can compute an accumulative QoE value for each possible path of a network flow and select a path with a minimum QoE value. For example, the management service can add the QoE values of all nodes along a path to obtain the cumulative QoE value of the path. In the example shown in FIG. 2A, there are a number of possible paths between nodes 202 and 206, including paths 208, 210, and 212, and the cumulative QoE values for the three paths are 1, 0, and 2, respectively. Accordingly, the management service can select path 210 as the path with the optimum QoE performance. Note that path 210 has one extra hop compared with path 208. However, when QoE is the main concern, the management service would prefer a path with better QoE performance even if the number of hops is not minimum.

Because the same node operating status may affect the QoE of different applications differently, the different applications or different types of applications may have different QoE values. Therefore, the management service needs to generate different QoE topologies of the network for the different applications or different types of applications. In one example, the management service may categorize applications in the network into N different categories, such as streaming applications, text-or graphic-based applications, VoIP applications, encryption applications, gaming applications, video-conference applications, etc. Accordingly, the management service can generate N QoE topologies, one for each application/flow category.

Figure 2B:
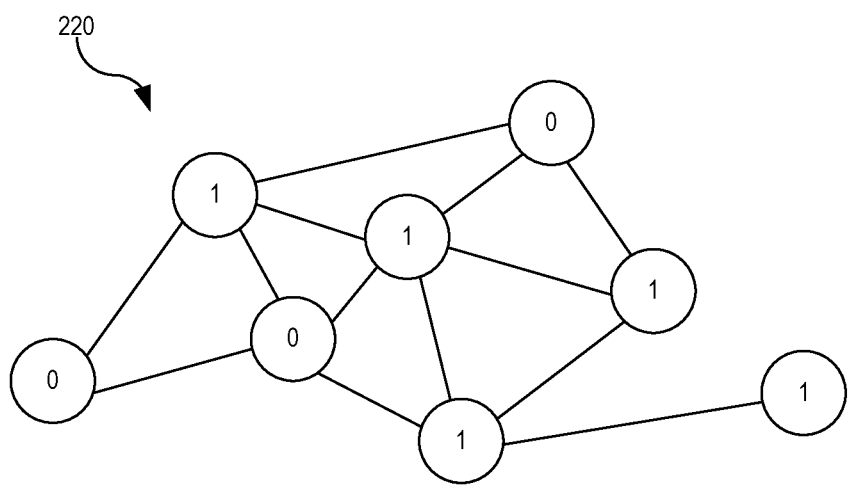
FIG. 2B illustrates an example of the QoE topology of a network, according to one aspect of the instant application.

For example, QoE topology 200 shown in FIG. 2A may be generated for a particular type of application (e.g., the streaming applications), and the QoE topology for a different type of application (e.g., the video-conference applications) may be different. FIG. 2B illustrates an example of the QoE topology of a network, according to one aspect. As can be seen from FIG. 2A and FIG. 2B, the connectivity among the nodes in the two topologies remains the same, but the nodes in the two topologies can have different QoE values.

When selecting a path for a network flow, the management service can first generate a QoE topology based on the type of application associated with the flow. For example, for a network flow originated from a video-streaming server, the management service can generate a QoE topology of the network based on the video-streaming QoE values of the nodes (e.g., QoE topology 200 shown in FIG. 2A) and then compute the cumulative QoE values for all possible paths based on this QoE topology. On the other hand, for a network flow originated from a video-conference server, the cumulative QoE values for all possible paths may be computed based on QoE topology 220 shown in FIG. 2B.

The number of possible paths for a network flow in a large-scale network can be large, and computing the cumulative QoE for a large number of paths can be time-consuming and computationally costly. To reduce the computational cost, according to some aspects, a QoE topology can be simplified by removing nodes with a significantly negative QoE impact. When the QoE values are binary, a QoE topology can be simplified by removing nodes with no-zero QoE values. When the QoE values are multi-level, the QoE topology can be simplified by removing nodes with QoE values greater than a predetermined threshold. For example, if the QoE values are between 0 and 5, the QoE topology can be simplified by removing nodes with QoE values greater than two.

Figure 3A:
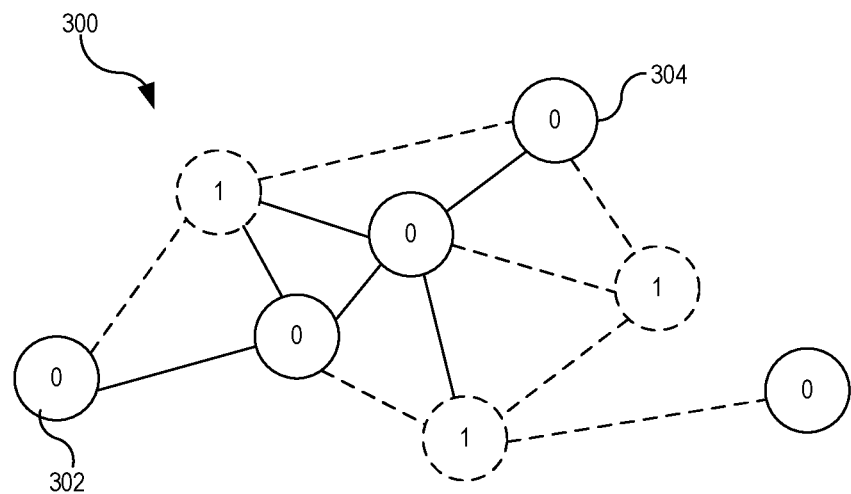
FIGS. 3A-3B illustrate examples of simplified QoE topologies of the network, according to one aspect of the instant application.
Figure 3B:
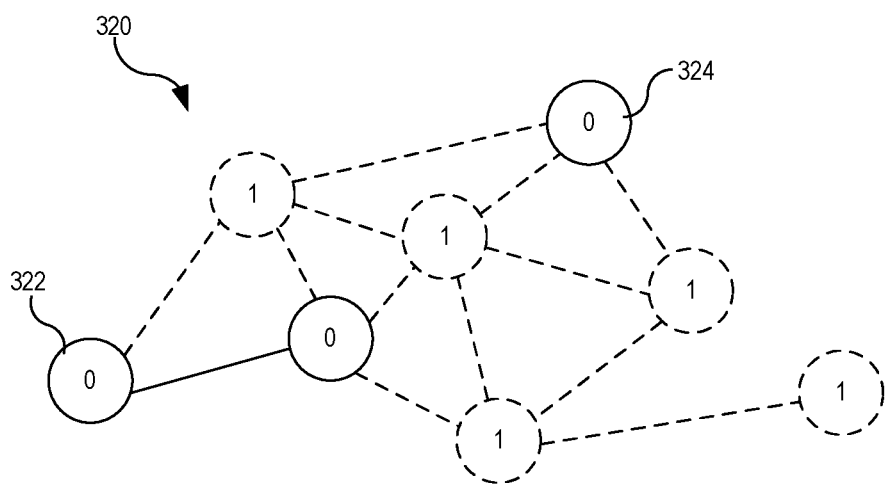

FIGS. 3A-3B illustrate examples of simplified QoE topologies of the network, according to one aspect of the instant application. More specifically, QoE topology 300 shown in FIG. 3A is a simplified version of QoE topology 200 shown in FIG. 2A, and QoE topology 320 shown in FIG. 3B is a simplified version of QoE topology 220 shown in FIG. 2B. For a better comparison, the removed nodes and edges are shown in FIGS. 3A-3B as dashed circles and lines. As can be seen in FIG. 3A, after removing the nodes with non-zero QoE values, the resulting topology can be significantly simplified compared with the original QoE topology. More specifically, only one path is left between a source node 302 and a destination node 304. The simplified QoE topology makes computing the cumulative QoE value and selecting the optimum QoE path much easier.

In the example shown in FIG. 3B, removing nodes with non-zero QoE values can result in a scenario where no path exists between a source node 322 and a destination node 324. In fact, only three nodes remain in the simplified graph. In such a scenario, the management service may need to select a path with suboptimal QoE performance. To do so, the simplified QoE topology can be augmented by adding nodes with non-zero QoE values. In one example, the nodes with non-zero QoE values can be added, one at a time, based on the frequency of the node being included in a selected path of other flows. In other words, nodes that are more frequently selected can have a higher priority. In another example, low-latency nodes can have a higher priority for being included in a selected path. Other algorithms can also be used to augment the simplified QoE topology until one or more suboptimal QoE paths can be established between the source and destination nodes. The management service can further select, among the suboptimal QoE paths, a path with the minimum cumulative QoE value.

Note that the network traffic pattern and the operating status of each node can change dynamically, and the management service can correspondingly update the QoE value of each node in the network. As discussed previously, the QoE values associated with a number of flows or applications for a node may be updated periodically either by a client service residing on the node or by the cloud-based management service. According to one aspect, the QoE topologies associated with the applications may be updated periodically or updated each time a node's QoE is modified.

Figure 4:
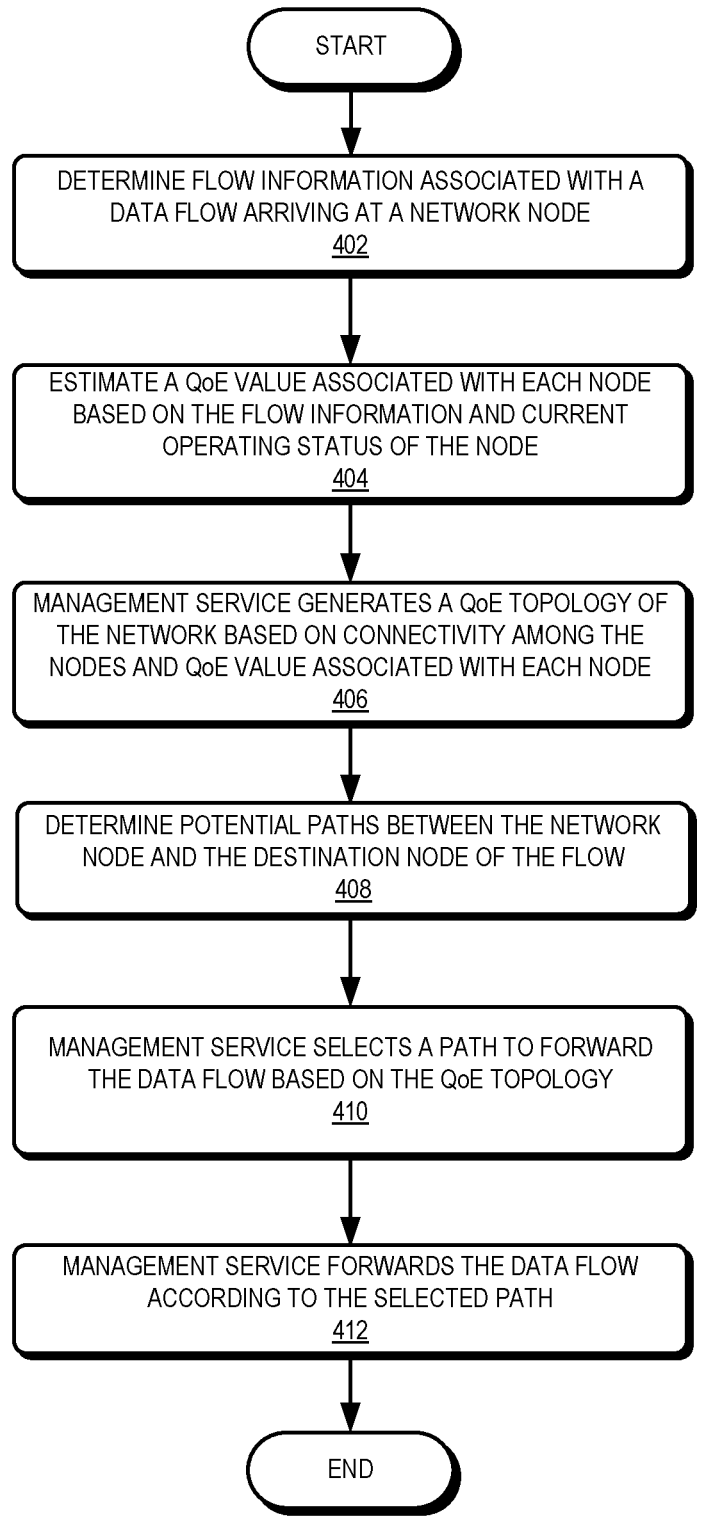
FIG. 4 presents a flowchart illustrating an example of a flow-control process, according to one aspect of the instant application.

FIG. 4 presents a flowchart illustrating an example of a flow-control process, according to one aspect. During operation, the client service executing on a network node (e.g., a router, switch, controller, AP, etc.) can determine the flow information associated with a flow arriving at the network node (operation 402). The flow information can include the source and destination addresses of the flow, the type of application associated with the flow, etc. In addition, the client service may also monitor the operating status of the node, including but not limited to: memory usage, CPU utilization rate, node temperature, available buffer space, etc.

Based on the flow information and the current operating status of each node in the network, a QoE value associated with each node in the network can be estimated (operation 404). Depending on the implementation, the QoE value can be defined based on different criteria. For example, the criteria can include a simple mapping function between the node's operating status and the QoE value. In another example, the criteria can include a mapping relationship between the QoS metrics and the QoE value. More sophisticated QoE-defining criteria can also be used. For example, a machine-learning model can be trained to learn the mapping between QoE values and the node's operating status plus the flow information. The QoE value can include a binary or multi-level value. According to some aspects, the client service executing on each node can estimate the QoE value. The client service can estimate a QoE value for each flow arriving at the node or for each type of flow. Once the QoE values for different flows are calculated, the client service can report the QoE values to the management service executing on a remote service or a cloud-based network-management platform. According to alternative aspects, the client service can report the operating status of the node and flow information to a remote management service, which receives such information from each node in the network and calculates the QoE values for each node.

The management service can then generate a QoE topology of the network based on the connectivity among the nodes and the QoE value associated with each node in the network (operation 406). Note that the connectivity among the nodes in the network can be known to the management service. For example, the management service may store a graph (e.g., an undirected graph) that indicates the connectivity among the network nodes. The management service can generate the QoE topology by assigning each node in the connectivity graph a QoE value. Because the QoE value of a node can be different for different network flows or different types of network flows, the management service can generate a plurality of QoE topologies, one for each flow or each type of flow.

The management service can determine a plurality of potential paths between the network node receiving the data flow and the destination node of the data flow (operation 408). The potential paths can be determined based on the connectivity among the nodes indicated by the QoE topology. The management service can select a path to forward the data flow based on the QoE topology (operation 410). According to some aspects, the management service can compute the cumulative QoE value for each possible path based on the QoE topology and select a path that can provide the optimum QoE performance for the data flow. In some implementations, a positive QoE value of a node indicates that the node negatively affects the QoE, and a larger QoE value corresponds to a more negative QoE effect. Accordingly, the management service can select a path with a minimum cumulative QoE value.

Because there can be many potential paths for a data flow in a relatively large network, the management service can simplify the QoE topology by removing nodes that negatively affect the QoE before computing the cumulative QoE values for potential paths. For example, when the QoE values are binary, the management service can simplify the QoE topology by removing nodes with non-zero values.

According to some aspects, the management service can also temporarily suspend a node when it determines that the node negatively affects the QoE. For example, if the management service determines that a switch in the network is overloaded and may cause QoE degradation, the management service can temporarily disable the switch and select a neighboring switch with better QoE performance as a replacement switch. Traffic previously routed to the disabled switch can be routed to the replacement switch, until the QoE performance of the disabled switch recovers. In another example, if the management service determines that an overloaded AP is having poor QoE performance, the management service can send a control signal to the AP to prevent new client devices from connecting to the AP. The management service can identify an alternative AP to provide connection services to new client devices, thereby achieving the QoE-based load balance among the APs. In yet another example, the management service may detect that an end device (e.g., a user device or an IoT device) experiences poor QoE. In addition to the possibility that the end device is malfunctioning, the management service may also infer that the uplink node (e.g., an AP) may be the reason for the poor QoE at the end device. Accordingly, the management service may identify a new uplink node to provide connection services to the end device.

Subsequent to selecting the path, the management service can forward the data flow according to the selected path (operation 412). According to some aspects, the management service can send control signals to the nodes on the selected path to facilitate the proper forwarding of the data flow.

Figure 5:
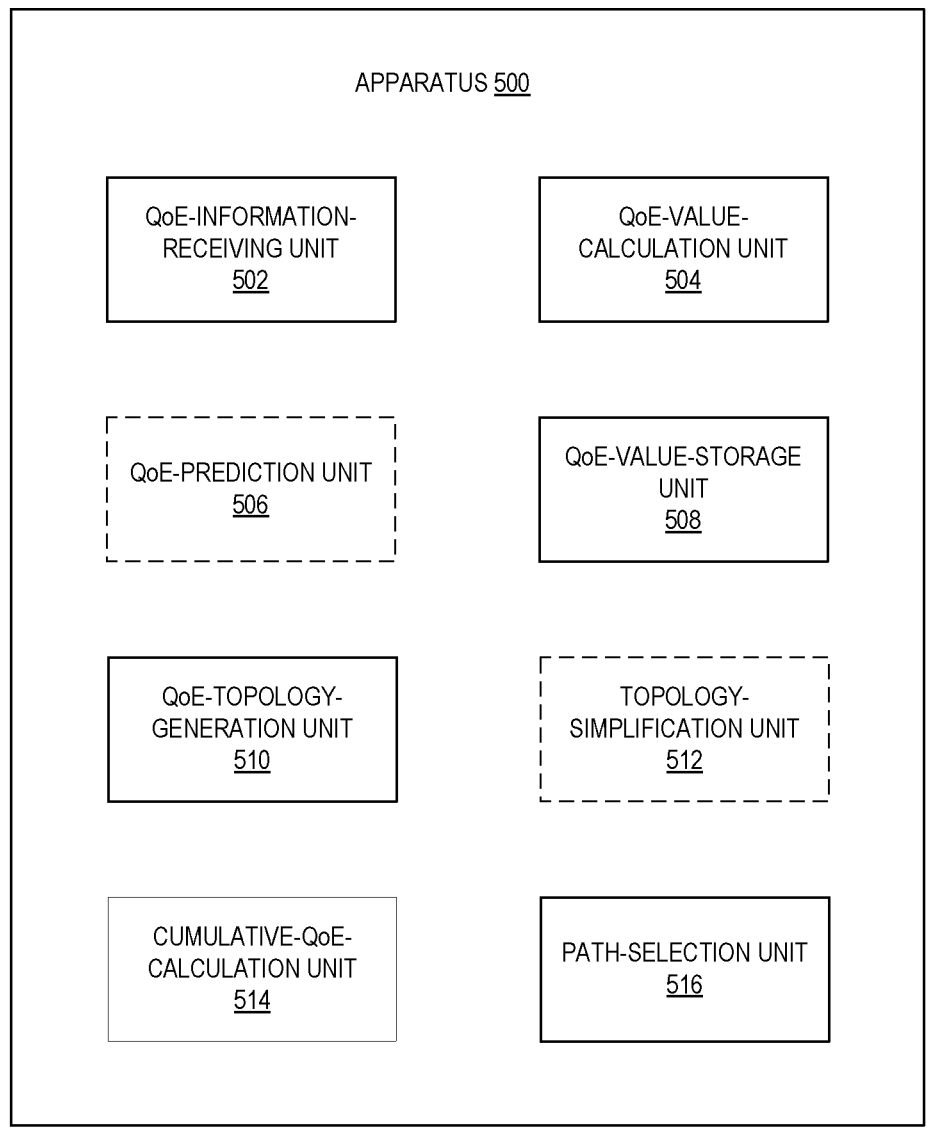
FIG. 5 illustrates an example of an apparatus for performing QoE-based flow control, according to one aspect of the instant application.

FIG. 5 illustrates an example of an apparatus for performing QoE-based flow control, according to one aspect. Apparatus 500 can include a QoE-information-receiving unit 502, a QoE-value-calculation unit 504, an optional QoE-prediction unit 506, a QoE-value-storage unit 508, a QoE-topology-generation unit 510, an optional topology-simplification unit 512, a cumulative-QoE-calculation unit 514, and a path-selection unit 516. Apparatus 500 can be implemented using hardware components, software components, or both. According to some aspects, apparatus 500 can reside on a network-management server or a cloud-based network-management platform.

QoE-information-receiving unit 502 can be responsible for receiving various information related to the QoE from each node in the network. According to some aspects, such information can include the operating status of the node and information associated with data flows arriving at the node. The operating status of the node that may affect the QoE can include memory usage, CPU utilization rate, temperature, available buffer space, etc. The flow information can include the source and destination addresses of each flow and the application types of the flows. According to one aspect, a client service executing on each network node may directly compute a QoE value for each flow or each type of flow arriving at the network node. In such a situation, QoE-information-receiving unit 502 can also receive the calculated QoE values from the client service.

QoE-value-calculation unit 504 can be responsible for calculating or estimating the QoE value(s) for each node in the network. Due to the dynamic nature of the network, QoE-value-calculation unit 504 can periodically calculate the QoE value(s). The QoE-calculation period can be between 30 seconds and five minutes. According to some aspects, QoE-value-calculation unit 504 can calculate the QoE value at a node for a flow based on the current operating status of the node and the flow information. QoE-value-calculation unit 504 can use various techniques to calculate the QoE values, such as applying a mapping function to convert QoS parameters (e.g., delay, jitter, packet loss, throughput, etc.) to QoE values, determining a QoE vector based on various aspects of the operating status and then computing the magnitude of the QoE vector, and applying a machine-learning technique to learn the mapping relationship between the operating status of the node and the QoE values for different types of applications.

Optional QoE-prediction unit 506 can be responsible for predicting future QoE values at a node. According to some aspects, QoE-prediction unit 506 can predict the future QoE of a node based on the current QoE of the node. According to alternative aspects, QoE-prediction unit 506 can use a machine-learning technique to classify incoming flows into different types or clusters and predict the QoE for an incoming flow based on to which cluster the flow belongs. QoE-prediction unit 506 can preemptively compute, based on the current node status, the corresponding QoE values for different types of flows. When a flow arrives at a node, QoE-prediction unit 506 can predict a QoE value for the flow based on the classification of the flow. Moreover, QoE-prediction unit 506 can use a machine-learning technique to learn the correlation between the time of the day or the day of the week and the QoE values.

QoE-value-storage unit 508 can be responsible for storing the instant and future QoE values of the nodes in the network. Because the QoE values are computed periodically, the content of QoE-value-storage unit 508 can be updated periodically. QoE-topology-generation unit 510 can be responsible for generating a QoE topology for each flow or each type of flow in the network. More specifically, QoE-topology-generation unit 510 can first obtain an undirected graph representing the connectivity among nodes in the network and then associate each node in the graph with a QoE value. Topology-simplification unit 512 can be optional and responsible for simplifying the QoE topology. For example, nodes with undesired QoE performance can be removed from the QoE topology. If the simplification results in a QoE topology with no available path between predetermined source and destination nodes, the simplified graph can be augmented to reinstate the removed nodes.

Cumulative-QoE-calculation unit 514 can be responsible for calculating a cumulative QoE value of the potential path for a data flow. According to some aspects, the QoE values of nodes on a potential path can be added one by one to obtain the cumulative QoE value for that path. Note that the potential path for a data flow can be determined based on the QoE topology or the simplified QoE topology. Path-selection unit 516 can be responsible for selecting a path with the best QoE performance based on the cumulative QoE values of all potential paths.

Figure 6:
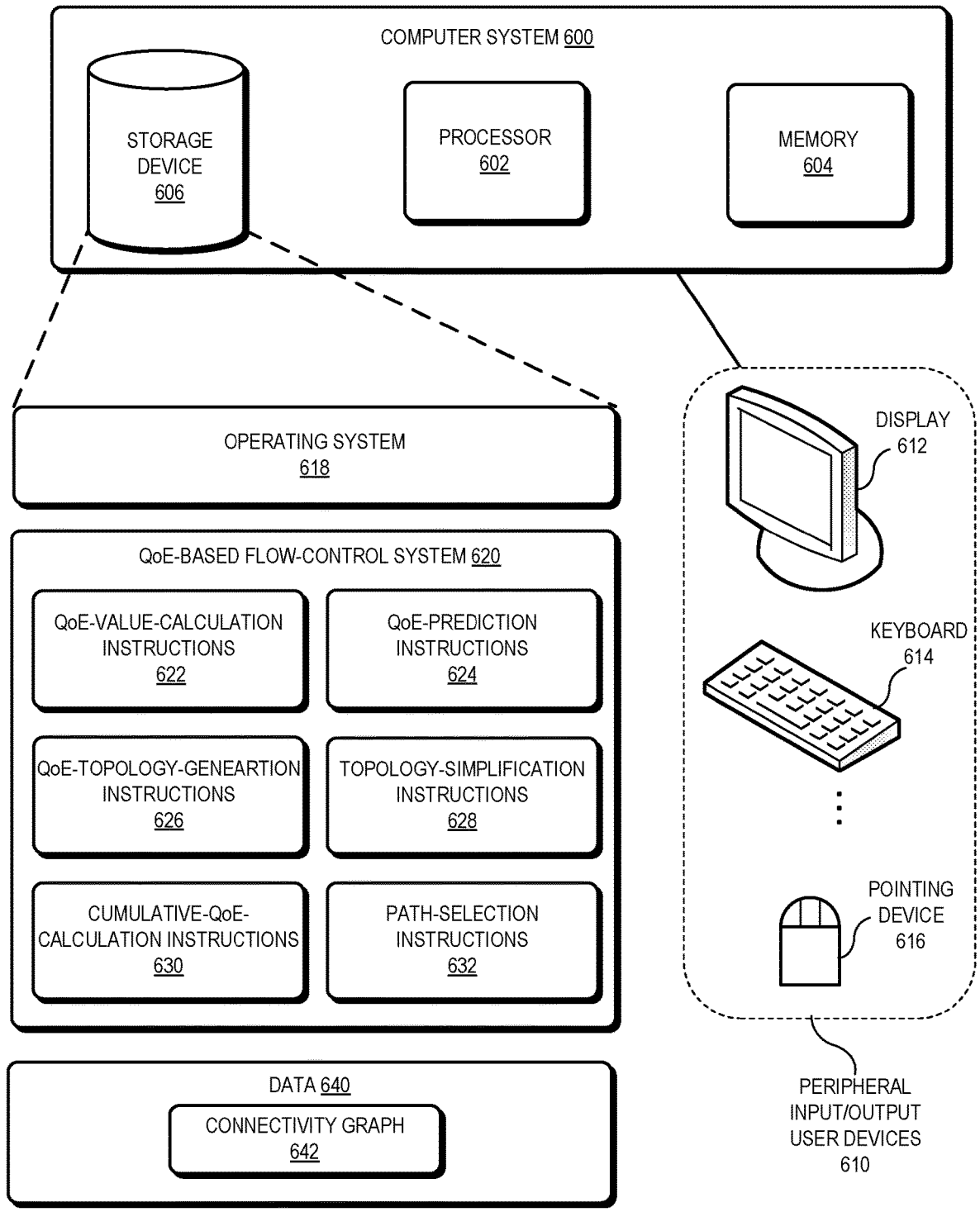
FIG. 6 illustrates an example of a computer system that facilitates the QoE-based flow control, according to one aspect of the instant application.

FIG. 6 illustrates an example of a computer system that facilitates the QoE-based flow control, according to one aspect of the instant application. Computer system 600 can include a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a QoE-based flow-control system 620, and data 640.

QoE-based flow control system 620 can include instructions, which when executed by computer system 600, can cause computer system 600 or processor 602 to perform methods and/or processes described in this disclosure. Specifically, by executing these instructions, computer system 600 can achieve the goal of selecting a path for a network flow that can provide optimum QoE performance. QoE-based flow-control system 620 can include instructions for calculating QoE values for nodes in the network (QoE-value-calculation instructions 622), instructions for predicting future QoE values (QoE-prediction instructions 624), instructions for generating QoE topologies of the network (QoE-topology-generation instructions 626), instructions for simplifying the QoE topologies (topology-simplification instructions 628), instructions for calculating cumulative QoE values for potential paths (cumulative-QoE-calculation instructions 630), and instructions for selecting a path for a network flow with optimal QoE performance (path-selection instructions 632). Data 640 can include a network connectivity graph 642.

In general, the disclosure describes a system and method for performing QoE-based flow control in a network. More specifically, a number of QoE values can be calculated for each node in the network based on how this node affects the QoE of different flows in the network, with each QoE value corresponding to a particular flow or a particular type of flow. The QoE value for a flow or a type of flow can be binary or multi-level and can be computed based on the operating status of the node and flow information associated with the flow. A QoE topology of the network can be generated for each flow or each type of flow based on a connectivity graph of the network and the corresponding QoE values of nodes in the network. The system can compute a cumulative QoE value for each potential path of a flow by summing up the QoE values of the nodes in the potential path. The system can select a path that can provide the optimum QoE performance to forward the flow by comparing the cumulative QoE values of the potential paths.

One aspect can provide a system and method for selecting a path for a data flow in a network. During operation, a first node receiving the data flow can determine flow information associated with the data flow, the flow information specifying at least a destination node. The system estimates a Quality of Experience (QoE) value associated with each node in the network based on the flow information and current operating status of each node, the QoE value of a respective node indicating whether the respective node negatively affects QoE performance of the data flow. A management service generates a QoE topology of the network based on connectivity among the plurality of nodes in the network and the QoE value associated with each node; determines a plurality of potential paths between the first node and the destination node, with each potential path comprising a plurality of intermediate nodes; and selects a path that provides best QoE performance among the plurality of potential paths based on the QoE topology of the network. Selecting the path comprises computing a cumulative QoE value of each potential path based on QoE values of the intermediate nodes included in the potential path.

In a variation on this aspect, the current operating status of each node can include one or more of: memory usage, central processing unit (CPU) utilization rate, temperature of the node, and available buffer space.

In a variation on this aspect, the QoE value can include a binary value, and a non-zero QoE value indicates that the corresponding node negatively affects the QoE performance of the data flow.

In a further variation, computing the cumulative value of a potential path can include summing the QoE values of intermediate nodes included in the potential path.

In a variation on this aspect, the system can estimate different QoE values for different types of data flows.

In a further variation, the different types of data flows can include one or more of: data flows associated with streaming applications, data flows associated with voice over Internet (VOIP) applications, data flows associated with video-conference applications, data flows associated with gaming applications, data flows associated with text-or graphic-based applications, and data flows associated with encryption applications.

In a variation on this aspect, the system can predict a future QoE value associated with each node.

In a further variation, predicting the future QoE value can include one of: predicting the future QoE value based on flows currently arriving at the node, applying a machine-learning technique to classify an incoming data flow, and applying a machine-learning technique to learn a mapping relationship between the QoE value and time.

In a variation on this aspect, generating the QoE topology can include obtaining a connectivity graph of the network and assigning each node in the graph a corresponding QoE value.

In a variation on this aspect, the system can simplify the QoE topology by removing one or more nodes that negatively affect the QoE performance of the data flow.

The foregoing description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

What is claimed is:

1. A method for selecting a path for a data flow in a network comprising a plurality of nodes, the method comprising:
   receiving, at a system comprising a hardware processor, flow information associated with the data flow at a first node in the network, wherein the flow information specifies a destination node;
   obtaining, by the system, Quality of Experience (QoE) values associated with the plurality of nodes based on the flow information and current operating status of the plurality of nodes, wherein a QoE value of a respective node of the plurality of nodes indicates whether the respective node negatively affects a QoE performance of the data flow;
   generating, by the system, a QoE topology of the network based on connectivity among the plurality of nodes in the network and the QoE values associated with the plurality of nodes;
   generating, by the system, a simplified QoE topology of the network by removing at least one node from the QoE topology based on a QoE value of the at least one node relative to QoE values of other nodes of the plurality of nodes;
   determining, by the system, a plurality of potential paths in the simplified QoE topology between the first node and the destination node, wherein a potential path of the plurality of potential paths comprises a plurality of intermediate nodes between the first node and the destination node; and
   selecting, by the system, the path that provides a best QoE performance among the plurality of potential paths based on the simplified QoE topology wherein the selecting of the path comprises computing a cumulative QoE value of each respective potential path of the plurality of potential paths based on QoE values of intermediate nodes included in the respective potential path.

2. The method of claim 1, wherein a current operating status of a respective node of the plurality of nodes comprises one or more of:
- a memory usage in the respective node;
- a central processing unit (CPU) utilization in the respective node;
- a temperature of the respective node; or
- an available buffer space in the respective node.

3. The method of claim 1, wherein a QoE value of a corresponding node comprises a binary value, and wherein a non-zero QoE value indicates that the corresponding node negatively affects the QoE performance of the data flow.

4. The method of claim 1, wherein computing the cumulative QoE value of each respective potential path comprises summing the QoE values of the intermediate nodes included in the respective potential path.

5. The method of claim 1, further comprising estimating different QoE values for different types of data flows.

6. The method of claim 5, wherein the different types of data flows comprise one or more of:
- a data flow associated with a streaming application;
- a data flow associated with a voice over Internet (VOIP) application;
- a data flow associated with a video-conference application;
- a data flow associated with a gaming application;
- a data flow associated with a text-or graphic-based application; or
- a data flow associated with an encryption application.

7. The method of claim 1, wherein the obtaining of the QoE values associated with the plurality of nodes comprises predicting the QoE values for future time points, and wherein the QoE value of the at least one node removed to generate the simplified QoE topology is a predicted QoE value at a future time point.

8. The method of claim 7, wherein the predicting of the QoE values comprises applying machine learning to predict the QoE values at the future time points.

9. The method of claim 1, wherein the removing of the at least one node from the QoE topology to generate the simplified QoE topology is based on comparing the QoE value of the at least one node to a threshold.

10. The method of claim 1, further comprising suspending the at least one node based on the QoE value of the at least one node indicating that the at least one node negatively affects the QoE performance of the data flow.

11. A computer system comprising:
- a processor; and
- a non-transitory storage medium storing instructions executable on the processor to:
  - receive flow information associated with a data flow at a first node in a network, wherein the flow information specifies a destination node;
  - obtain Quality of Experience (QoE) values associated with a plurality of nodes based on the flow information and current operating status of the plurality of nodes, wherein a QoE value of a respective node of the plurality of nodes indicates whether the respective node negatively affects QoE performance of the data flow;
  - generate a QoE topology of the network based on connectivity among the plurality of nodes in the network and the QoE values associated with the plurality of nodes;
  - generate a simplified QoE topology of the network by removing at least one node from the QoE topology based on a QoE value of the at least one node relative to QoE values of other nodes of the plurality of nodes;
  - determine a plurality of potential paths in the simplified QoE topology between the first node and the destination node, wherein a potential path of the plurality of potential paths comprises a plurality of intermediate nodes between the first node and the destination node; and
  - select a path that provides a best QoE performance among the plurality of potential paths based on the simplified QoE topology wherein the selecting of the path comprises computing a cumulative QoE value of a respective potential path based on QoE values of intermediate nodes included in the respective potential path.

12. The computer system of claim 11, wherein the obtaining of the QoE values associated with the plurality of nodes comprises receiving the QoE values associated with the plurality of nodes at the computer system from a client service.

13. The computer system of claim 11, wherein the obtaining of the QoE values associated with the plurality of nodes comprises computing the QoE values associated with the plurality of nodes at the computer system.

14. The computer system of claim 11, wherein the computing of the cumulative QoE value of the respective potential path comprises summing the QoE values of the intermediate nodes included in the respective potential path.

15. The computer system of claim 11, wherein the instructions are executable on the processor to suspend the at least one node based on the QoE value of the at least one node indicating that the at least one node negatively affects the QoE performance of the data flow.

16. The computer system of claim 11, wherein the removing of the at least one node from the QoE topology to generate the simplified QoE topology is based on comparing the QoE value of the at least one node to a threshold.

17. The computer system of claim 11, wherein the obtaining of the QoE values associated with the plurality of nodes comprises predicting the QoE values for future time points, and wherein the QoE value of the at least one node removed to generate the simplified QoE topology is a predicted QoE value at a future time point.

18. The computer system of claim 17, wherein the predicting of the QoE values comprises applying machine learning to predict the QoE values at the future time points.

19. A non-transitory machine-readable storage medium comprising instructions that upon execution cause a system to:
- receive flow information associated with a data flow at a first node in a network, wherein the flow information specifies a destination node;
- obtain Quality of Experience (QoE) values associated with a plurality of nodes based on the flow information and current operating status of the plurality of nodes, wherein a QoE value of a respective node of the plurality of nodes indicates whether the respective node negatively affects QoE performance of the data flow;
- generate a QoE topology of the network based on connectivity among the plurality of nodes in the network and the QoE values associated with the plurality of nodes;
- generate a simplified QoE topology of the network by removing at least one node from the QoE topology based on a QoE value of the at least one node relative to QoE values of other nodes of the plurality of nodes;

determine a plurality of potential paths in the simplified QoE topology between the first node and the destination node, wherein a potential path of the plurality of potential paths comprises a plurality of intermediate nodes between the first node and the destination node; and select a path that provides a best QoE performance among the plurality of potential paths based on the simplified QoE topology, wherein the selecting of the path comprises computing a cumulative QoE value of a respective potential path based on QoE values of intermediate nodes included in the respective potential path.

20. The non-transitory machine-readable storage medium of claim 19, wherein the instructions upon execution cause the system to:

suspend the at least one node based on the QoE value of the at least one node indicating that the at least one node negatively affects the QoE performance of the data flow.

* * * * *